Aug. 26, 1969
L. W. MARINO
3,463,223
TERMINAL ROOM AIR CONDITIONER AND SYSTEM
Filed Aug. 21, 1967
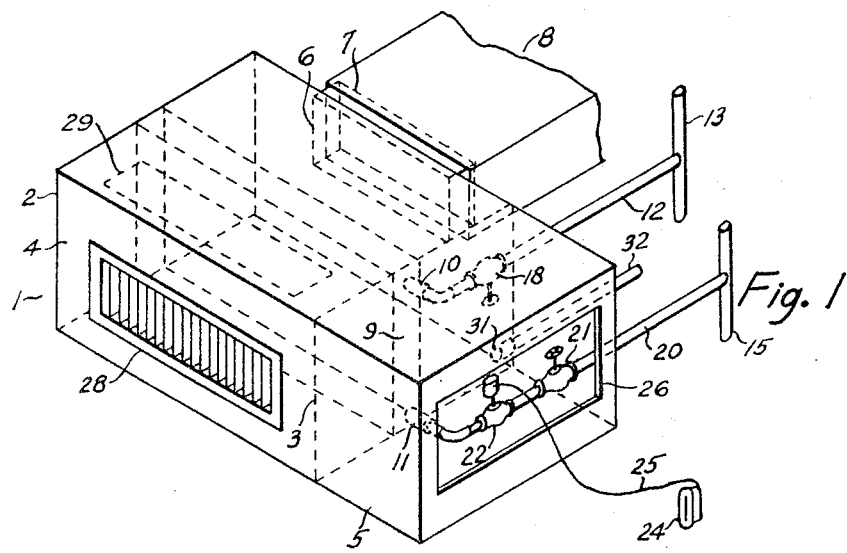
Fig. 1
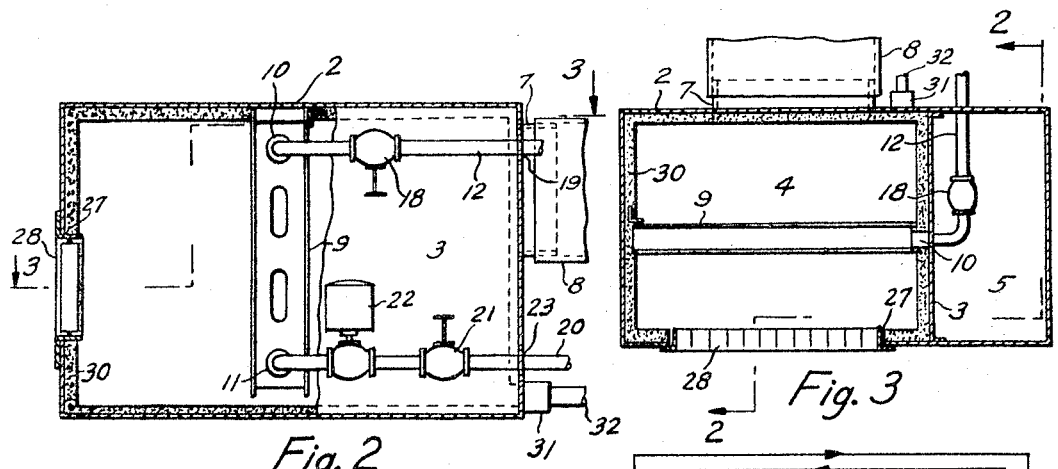
Fig. 2
Fig. 3
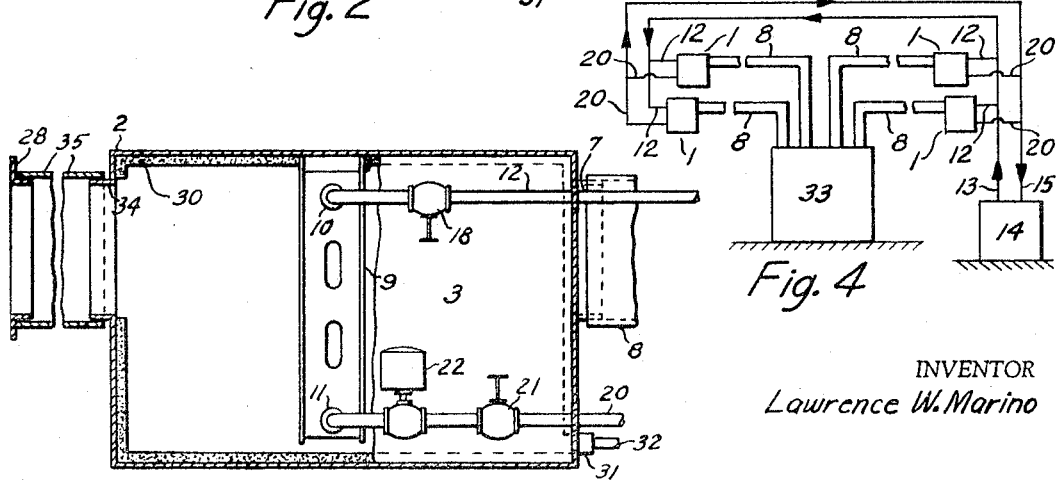
Fig. 5
Fig. 4
INVENTOR
Lawrence W. Marino
Jack Schuman
ATTORNEY

United States Patent Office

3,463,223
Patented Aug. 26, 1969

3,463,223
TERMINAL ROOM AIR CONDITIONER AND SYSTEM
Lawrence W. Marino, 4020 New York Ave., Seaford, N.Y. 11783
Filed Aug. 21, 1967, Ser. No. 662,040
Int. Cl. F24f 3/00; F28f 13/12
U.S. Cl. 165—22                4 Claims

ABSTRACT OF THE DISCLOSURE

Filtered ambient, heated or cooled air from central source supplied to plurality of terminal room air conditioners, each having compartment with water coil and another compartment with thermostatically controlled valve, each water coil being connected to central piped system of hot or cold water to heat or cool filtered air delivered to room by air conditioner. Individual rooms can be heated or cooled independently of heating or cooling provided in other rooms.

BACKGROUND OF THE INVENTION

This invention relates broadly to apparatus for heating or cooling a room. More specifically, this invention relates to a particular terminal room air conditioner and system for controlling the temperature of air supplied to a room or a plurality of rooms.

Nowhere in the prior art is there any teaching of providing a terminal room air conditioner to heat or cool filtered air supplied by a central source, with all of the air delivered to the room by the terminal room air conditioner coming from the central source, and with each of a plurality of terminal room air conditioners being adapted to heat or cool individual rooms independently of the heating or cooling performed by other terminal room air conditioners in the other room, nor is there any teaching in the prior art of a terminal room air conditioner provided with a water coil connectable to hot or cold water lines to heat or cool air filtered at a central source.

SUMMARY OF THE INVENTION

One of the objects of this invention is to provide improved means for heating or cooling a room or plurality of rooms.

Still another object of this invention is to provide efficient apparatus and a combination central air and water system for heating or cooling a room or plurality of rooms, with reduced noise level and with greater economies than are obtainable with conventional equipment.

A further object of this invention is to provide a unitary type terminal room air conditioner which does not require air filters in its structure and which thereby eliminates the related maintenance required by dirty or clogged filters.

Yet another object of this nivention is to provide a terminal room air conditioner and system which permits automatic and controlled maintenance of space temperatures for an individual room or for a plurality of individual rooms with respect to diverse heating or cooling demands.

Other and further objects of this invention will become apparent during the course of the following description and by reference to the accompanying drawing and the appended claims.

I have discovered that the foregoing objects can be attained by providing each of a plurality of rooms with a terminal room air conditioner, each with a water coil connectable to hot or cold water lines and a thermostatically controlled water valve regulating water flow therethrough, all of the air delivered to the rooms by the respective terminal room air conditioners coming to the terminal room air conditioners from a central source of previously filtered air, which may be heated, cooled or ambient.

BRIEF DESCRIPTION OF THE DRAWING

FIGURE 1 represents a view in perspective of the present invention, internal or obscured components being shown in dashed lines, and with the access panel removed.

FIGURE 2 represents a view in vertical section, taken along the line 2—2 of FIGURE 3.

FIGURE 3 represents a view in horizontal section, taken along the line 3—3 of FIGURE 2.

FIGURE 4 represents a diagrammatic view of a central filtered air supply, water supply, and several terminal room air conditioners associated therewith.

FIGURE 5 represents a view in vertical section similar to FIGURE 2, showing an alternate arrangement of discharge or outlet diffuser or grille.

DESCRIPTION OF THE PREFERRED EMBODIMENT

Terminal room air conditioner 1 embodying the principles of the present invention is seen as comprising cabinet or housing 2 adapted to be suitably supported in the room or chamber to be served with conditioned air. Housing 2 is advantageously designed for a pleasing external appearance, and preferably is made of metal.

Partition 3 is mounted within housing 2, thereby subdividing the interior of said housing 2 into an air conditioning compartment 4 and a piping compartment 5.

The rear of housing 2 is provided with air inlet opening 6 surrounded by connection collar 7 secured to the said housing 2 and adapted to be inserted into air supply duct 8, whereby a establish a tight and leakproof connection between the interior of air supply duct 8 and the interior of air conditioning compartment 4.

Water coil 9 is mounted within air conditioning compartment 4 of housing 1, in front of air inlet opening 7, and is provided with water inlet connection 10 and water outlet connection 11.

Conduit 12 communicates between water inlet connection 10 and water supply main 13, the latter being connected to a central water source 14 of hot or cold water, as hereinafter described. Conduit 12 is provided with normally open gate valve 18 within piping compartment 5 of housing 1. It will be noted that the rear of housing 1 is provided with an aperture 19 through which conduit 12 extends.

Conduit 20 communicates between water outlet connection 11 and water return main 15 leading back to central water source 14, and is provided with normally open gate valve 21 and automatic water regulating valve 22 within piping compartment 5 as shown. The rear of housing 2 is provided with aperture 23 through which conduit 20 extends. Thermostat 24, located at a convenient station in the room or chamber, continuously controls automatic water regulating valve 22 through line 25, it being understood that this portion of the control system is simplified and schematic, and that other conventional components, such as an aquastat (not shown) may be required.

Means are provided to permit access to the interior of piping compartment 5. Such means may conveniently take the form of a removable panel (not shown) covering opening 26 in the side of housing 1. Similar means may also be provided to permit access to the interior of air conditioning compartment 4.

Housing 2 is provided with aperture 27 in the front wall thereof and in front of water coil 9, which aperture 27 receives outlet diffuser or grille 28, thereby permitting communication between air conditioning compartment 4 and the room being served thereby. Outlet diffuser 28 is designed to discharge conditioned air into the room in a plane parallel to the floor of the room. It may sometimes be desired to discharge conditioned air in a plane perpendicular to the floor of the room, particularly when housing 2 is floor-mounted. In this situation, in lieu of aperture 27 and outlet diffuser 28, an alternately located outlet diffuser or grille 29 is shown in phantom on the top of housing 2 in FIGURE 1, again to the front of water coil 9, it being understood that a suitable top aperture is provided for such outlet diffuser 29 and that the front wall of housing 2 is imperforate.

The interior of air conditioning compartment 4 is lined with thermal and/or acoustic insulation indicated generally by the numeral 30. It will be noted that there is some clearance between the bottom of water coil 9 and the top of the insulation 30 at the bottom of air conditioning compartment 4. This clearance permits condensate in the forward portion of air conditioning compartment 4 (i.e., in that portion of air conditioning compartment 4 in front of water coil 9) to flow to the rear of air conditioning compartment 4 (i.e. to that portion of air conditioning compartment 4 in back of water coil 9.) Drain coupling 31 is mounted to the rear face of housing 2, communicating with the lowermost portion of air conditioning compartment 4, and drain conduit 32 communicates between said drain coupling 31 and a point of disposal (not shown) for condensate.

Air supply duct 8 communicates with a central source 33 of filtered air which may be at ambient temperature, or warm, or cold, as hereinafter described. Source 33 of the filtered air may be provided with fan means or the like to circulate such filtered air supply duct 8. It will be understood that, in a typical installation, several air supply ducts 8, and their respective terminal room air conditioners, are served by a single source 33 of filtered air. Such a typical installation is shown in FIGURE 4. It may be desired to recirculate room air back to the source 33, and the return ducts therefor have been omitted from FIGURE 4 for purposes of clarity.

The operation of the present invention will now be described.

The operator in charge of central air source 33 and central water source 14 has several options of operating combinations which illustrate the high degree of flexibility inherent in the present invention:

(a) Central air source 33 may be operated to deliver filtered ambient air to air supply ducts 8, and central water source 14 operated to deliver cold water to water supply mains 13 whereby cold water may be circulated through water coils 9 under the control of automatic water regulating valves 22, if cooling is required in the rooms, the extent of such cooling in the individual rooms being controlled by the individually selected setting of thermostat 24.

(b) Central air source 33 may be operated to deliver filtered and partially cooled (i.e., cooled below ambient temperature but above normally desired temperature) air to air supply ducts 8, and central water source 14 operated to deliver cold water to water supply mains 13 whereby cold water may be circulated through water coils 9 under the control of automatic water regulating valves 22, if cooling is required in the rooms, the extent of such cooling in the individual rooms being controlled by the individually selected setting of thermostat 24.

(c) Central air source 33 may be operated to deliver filtered ambient air to air supply ducts 8, and central water source 14 operated to deliver hot water to water supply mains 13 whereby hot water may be circulated through water coils 9 under the control of automatic water regulating valves 22, if heating is required in the rooms, the extent of such heating in the individual rooms being controlled by the individually selected setting of thermostat 24.

(d) Central air source 33 may be operated to deliver filtered and partially warmed (i.e., warmed above ambient temperature but below normally desired temperature) air to air supply ducts 8, and central water source 14 operated to deliver hot water to water supply mains 13 whereby hot water may be circulated through water coils 9 under the control of automatic water regulating valves 22, if heating is required in the rooms, the extent of such heating in the individual rooms being controlled by the individually selected setting of thermostat 24.

(e) Central air source 33 may be operated to deliver filtered and overcooled (i.e., cooled below normally desired temperature) air to air supply ducts 8, and central water source 14 operated to deliver hot water to water supply mains 13 whereby hot water may be circulated through water coils 9 under the control of automatic water regulating valves 22, if cooling is required in most of the rooms and heating simultaneously required in a few of the rooms. In those rooms requiring cooling, the individually selected setting of thermostat 24 will permit just enough hot water to flow through water coil 9 to heat the filtered cooled air to the desired temperature which will still be below ambient temperature. In those few rooms requiring heating, the individually selected setting of thermostat 24 will permit enough hot water to flow through water coil 9 to heat the filtered cooled air to the desired temperature which will be above ambient temperature.

(f) Central air source 33 may be operated to deliver filtered and overwarmed (i.e., warmed above normally desired temperature) air to air supply ducts 8, and central water source 14 operated to deliver cold water to water supply mains 13 whereby cold water may be circulated through water coils 9 under the control of automatic water regulating valves 22, if heating is required in most of the rooms and cooling simultaneously required in a few of the rooms. In those rooms requiring heating, the individually selected setting of thermostat 24 will permit just enough cold water to flow through water coil 9 to cool the filtered heated air to the desired temperature which will still be above ambient temperature. In those few rooms requiring cooling, the individually selected setting of thermostat 24 will permit enough cold water to flow through water coil 9 to cool the filtered heated air to the desired temperature which will be below ambient temperature.

Options (a) or (b) will normally be used in the summer or cooling season. Options (c) or (d) will normally be used in the winter or heating season. Options (e) or (f) will normally be used in intermediate seasons (spring or fall), wherein heating as well as cooling may be required during various portions of every 24-hour period, and where there is an unequal distribution of the heating or cooling load among the several rooms caused, for example, by some of the rooms being in the shade and others of the room being in the sun, by different exposure to wind, etc.

In the modification shown in FIGURE 5, provision is made for locating outlet diffuser or grille 28 separately from housing 2, thus permitting more flexibility in the installation to suit room requirements and decor. As shown, connection collar 34 is provided on housing 2. Extension duct 35 fits over connection collar 34 and outlet diffuser or grille 28 extends into extension duct 35, whereby tight and leak-proof connections are made between the interior of air conditioning compartment 4 and said outlet diffuser or grille 28.

It should be noted particularly that the terminal room air conditioner 1 passes into the room only air supplied by the central air source 33, and no air from the room enters the terminal room air conditioner 1 directly from the room (i.e., terminal room air conditioner 1 does not induce room air through itself into the stream of conditioned air). This feature eliminates the need for a filter in each terminal room air conditioner 1 to prevent water coil 9 from clogging, all air filtration being done centrally at central air source 33.

It should further be noted that, except for the valve operating mechanisms, there are no moving parts within the housings 2. Elements such as pumps, fans, etc. within the housings are not required. This reduces the size and cost of the terminal room air conditioners 1, and also eliminates sources of noise due to rotating components of these mechanisms, as well as the electric wiring which would be required to power the motors for the pumps and fans.

It should also be noted that the present system provides a very high degree of flexibility with a central installation 33 for the filtered air, in that each room may be heated or cooled to the desired extent independently of heating or cooling provided in any other room.

I claim:
1. System for individually controlling the temperature of each of a plurality of rooms, said system comprising:
 (a) a central source (33) of filtered ambient, or selectively warm, or selectively cold air located away from said rooms,
 (b) a central fluid source (14) of hot fluid or selectively cold fluid, located away from said rooms,
 (c) a terminal room air conditioner (1) in each of said rooms, each terminal room air conditioner (1) comprising:
  (i) a housing (2) having a first side and a second side,
  (ii) partition means (3) extending between the first and second sides of said housing (2) and defining a first compartment (4) and a second compartment (5) within said housing (2),
  (iii) insulation (30) mounted within said first compartment (4) to thermally and acoustically isolate the interior thereof,
  (iv) duct means (8) connecting the first side of said housing (2) to said central source (33) of filtered air, said duct means (8) communicating between said first compartment (4) and said central source (33) of filtered air, whereby filtered air is delivered to the first compartment (4) of said terminal room air conditioner (1),
  (v) outlet diffuser means (28) mounted to the second side of said housing (2), and communicating with said first compartment (4), and adapted to discharge air into said room, all of the air passing through said outlet diffuser means (28) being supplied through said duct means (8),
  (vi) a heat exchanger coil (9) mounted within said first compartment (4) of said housing (2) and interposed between said duct means (8) and said outlet diffuser means (28),
  (vii) piping means (12, 13) communicating between said heat exchanger coil (9) and said central fluid source (14), said piping means (12) being mounted at least partially within second compartment (5) of said housing (2),
  (viii) thermostatically controlled valve means (22) located within said second compartment (5) of said housing (2) responsive to the temperature of the room and adapted to regulate the flow of fluid through said heat exchanger coil (9) and thereby to control the temperature of air discharged from said outlet diffuser means (28) into said room,
  (ix) a gap below the bottom of said heat exchanger coil (9), said gap being adapted to permit the passage of condensate from one side of said housing (2) to the other side thereof,
  (x) drain conduit means (31) communicating with the lowermost portion of said first compartment and adapted to drain condensate from said first compartment (4),
 (d) whereby the temperature of air delivered by each terminal room air conditioner (1) may be controlled independently of the other terminal room air conditioners (1).

2. System as in claim 1, each terminal room air conditioner (1) further comprising:
 (xi) extension duct means (35) interposed between said outlet diffuser means (28) and said housing (2).

3. A terminal room air conditioner (1) comprising:
 (a) a housing (2) having a first side and a second side,
 (b) a partition (3) in said housing (2),
 (c) a first compartment (4) and a second compartment (5) within said housing (2) separated by said partition means (3),
 (d) insulation (30) mounted within said first compartment (4) to thermally and acoustically isolate the interior thereof,
 (e) connection means (7) connected to the first side of said housing (2) and communicating with the interior of said first compartment (4), said connection means (7) being adapted to be connected to a source (33) of filtered air, whereby filtered air is delivered to said first compartment (4),
 (f) outlet diffuser means (28) mounted to the second side of said housing (2) and communicating with the interior of said first compartment (4), and adapted to discharge air into a room, all of the air passing through said outlet diffuser means (28) being supplied through said connection means (7),
 (g) a heat exchanger coil (9) mounted within said first compartment (4) and interposed between said connection means (7) and said outlet diffuser means (28),
 (h) piping means (12) mounted at least partially within said second compartment (5) and communicating with said heat exchanger coil (9), said piping means (12) being adapted to be connected to a source (14) of hot or selectively cold fluid,
 (i) thermostatically controlled valve means (22) mounted within said second compartment (5) and adapted to regulate the flow of fluid through said heat exchanger coil (9) and thereby to control the temperature of air discharged from said outlet diffuser means (28),
 (j) a gap below the bottom of said heat exchanger coil (9), said gap being adapted to permit the passage of condensate from one side of said housing (2) to the other side thereof,
 (k) drain conduit means (31) communicating with the lowermost portion of said first compartment (4) and adapted to drain condensate from said first compartment (4).

4. Apparatus as in claim 3, further comprising:
 (1) extension duct means (35) interposed between said outlet diffuser means (28) and said housing (2).

References Cited

UNITED STATES PATENTS

| | | | |
|---|---|---|---|
| 2,072,166 | 3/1937 | Goodman | 165—22 |
| 2,159,276 | 5/1939 | Lawless | 165—20 |
| 2,819,023 | 1/1958 | Marshall | 165—22 |
| 2,899,180 | 8/1959 | Allander et al. | 165—22 |
| 3,288,205 | 11/1966 | Egbert | 165—22 |

ROBERT A. O'LEARY, Primary Examiner

CHARLES SUKALO, Assistant Examiner

U.S. Cl. X.R.

165—50, 122